US005864357A

United States Patent [19]

Akutsu

[11] Patent Number: 5,864,357

[45] Date of Patent: Jan. 26, 1999

[54] THERMAL PRINTING RECORDING APPARATUS HAVING A LIGHT-RECEIVING HEATING ELEMENT

[75] Inventor: Eiichi Akutsu, Ebina, Japan

[73] Assignee: Fuji Xerox Co., Ltd., Tokyo, Japan

[21] Appl. No.: 879,416

[22] Filed: Jun. 20, 1997

Related U.S. Application Data

[63] Continuation of Ser. No. 423,996, Apr. 18, 1995, abandoned.

[30] Foreign Application Priority Data

May 30, 1994 [JP] Japan .................................... 6-117034

[51] Int. Cl.[6] ............................ B41J 2/435; B41J 2/315; G01D 15/24; H01S 1/31

[52] U.S. Cl. ............................................ 347/262; 347/221

[58] Field of Search .................................... 347/224, 239, 347/262, 171, 264, 221; 358/296

[56] References Cited

U.S. PATENT DOCUMENTS

| | | | |
|---|---|---|---|
| 5,099,257 | 3/1992 | Nakazawa et al. | 347/201 |
| 5,262,800 | 11/1993 | Smith et al. | 347/262 |
| 5,309,244 | 5/1994 | Katagiri et al. | 347/239 |

OTHER PUBLICATIONS

"High Resolution Heat Transfer Thermal Printing Head", Nobuhiro Inoue, Information and Communication System Laboratory, Toshiba Corporation, Hino, Tokyo, Japan, 1988, pp. 250–253.

"Development of Multi–Head Full Color Theral Transfer Process", Leng Svay et al., *System Reprographic Products Development*, Fuji Xerox Co., Ltd., 1989, pp. 197–200.

"Characteristics of Thermal Transfer Printing by Laser Heating–the study of color printing–", Mitsuru Irie[1]), et al.[2]), *Graduate School of Science and Technology, Chiba University*[1]), *Department of Image Science, Faculty of Engineering, China University*[2]), 1991, pp. 237–240.

*Primary Examiner*—N. Le
*Assistant Examiner*—L. Anderson
*Attorney, Agent, or Firm*—Oliff & Berridge, PLC

[57] ABSTRACT

The present invention provides a novel thermal printing recording apparatus which can perform printing at a resolution as high as not less than 600 DPI and a higher rate than the prior art. The thermal printing recording apparatus of the present invention comprises a light-emitting device which emits light according to image data, and a light-receiving heating element which selectively generates heat on the area irradiated with light from the light-emitting device. The light-receiving heating element comprises a photoconductive layer which reduces its resistivity on the irradiated area, a heating layer laminated thereon, and a pair of electrically conductive layers arranged interposing the photoconductive layer and the heating layer in such a manner that an electric current is passed to the heating layer through the photoconductive layer on the area whose resistivity has been reduced to cause the heating layer to generate heat, one of the two electrically conductive layers on the photoconductive layer side being a transparent layer and transmitting light from the light-emitting device. In this arrangement, the light-receiving heating element is irradiated with light from the light-emitting device on the light transmitting electrically conductive layer according to image data so that it can convert the optical image to a heat image to perform printing.

9 Claims, 7 Drawing Sheets

THERMAL PRINTING RECORDING APPARATUS HAVING A LIGHT-RECEIVING HEATING ELEMENT

This is a Continuation of application Ser. No. 08/423,996 filed Apr. 18, 1995 now abandoned.

FIELD OF THE INVENTION

The present invention relates to a novel thermal printing recording apparatus which converts an optical input corresponding to image data to heat to perform imagewise printing.

BACKGROUND OF THE INVENTION

A representative example of the prior art thermal image printing technique is a printing mechanism shown in FIG. 11 using a thermal head 100 which is adapted to generate heat dotwise according to image signal to transfer an ink on an ink ribbon film 101 to a recording paper 102 so that imagewise printing is effected. Another example is a laser heat mode thermal printing technique shown in FIG. 12 which has been lately studied. In this mechanism, laser beam (LB) which has been emitted by a laser source 110 according to image signal is incident upon a special ink ribbon film 112 through a transparent support 111. The ink ribbon film 112 which has thus absorbed laser beam then generates heat to transfer an ink thereon to a recording paper 113 so that imagewise printing is effected. Shown at 120 in FIGS. 11 and 12 is a platen roll.

Many printing techniques employing such a thermal head have been realized in the form of apparatus. Many full-color printing techniques employing such a thermal head have been reported in Leng Svay et al., "Development of Multi-Head. Full-Color Thermal Transfer Process", preliminary transactions of Japan Hardcopy '89, page 197, Nobuhiro Inoue, "High Resolution Heat Transfer Thermal Printing Head", preliminary transactions of Japan Hardcopy '88, page 250, etc.

A laser heat mode thermal recording technique has already been proposed as disclosed in Mitsuru Irie et al., "Recording Properties of Laser Heat Transfer (3)", preliminary transactions of Japan Hardcopy '91, page 237 and JP-A-4-201485 (The term "JP-A" as used herein means an "unexamined published Japanese patent application").

In the heat-sensitive transfer recording process disclosed in JP-A-4-201485, an infrared-absorbing heat-softening coloring material layer formed on a support is irradiated with laser beam from a semiconductor laser to cause the surface layer of the heat-softening coloring material layer to melt, followed by the contact of the heat-softening coloring material layer with a material to which the coloring material is transferred. In another embodiment of the heat-sensitive transfer recording process, a colorless infrared-absorbing adhesive layer formed on the surface of a heat-softening coloring material layer formed on a support is irradiated with laser beam from a semiconductor laser to cause the surface layer of the adhesive layer to melt, followed by the contact of the adhesive layer with a material to which the adhesive material is transferred.

However, the foregoing conventional techniques have disadvantages. In some detail, the printing technique employing the foregoing conventional thermal head is disadvantageous in that the preparation of a thermal head which provides selective heating in a minute area is technically difficult, making it very difficult on a technical and economical basis to realize a resolution as high as not less than 600 DPI. Thus, the reproduction of a high image quality on an ordinary paper is little feasible at present.

In the laser heat mode thermal recording technique, an infrared-absorbing heat-softening coloring material layer or the like is irradiated with laser beam from a semiconductor laser to cause the surface layer of the heat-softening coloring material layer or the like to melt, followed by the contact of the heat-softening coloring material layer or the like with a material to which the coloring material is transferred, making it possible to provide selective heating in an area almost equal to the diameter of the laser beam from the semiconductor laser and hence realize printing at a resolution as high as not less than 600 DPI despite of thermal recording. However, the laser heat mode thermal recording technique which comprises irradiating an infrared-absorbing heat-softening coloring material layer or the like with laser beam from a semiconductor laser to cause the surface layer of the heat-softening coloring material layer or the like to melt to perform image printing is greatly disadvantageous in that it requires some time until the surface layer of the heat-softening coloring material or the like is melted, inevitably reducing the printing speed and making it difficult to put this printing technique into practical use.

SUMMARY OF THE INVENTION

It is therefore an object of the present invention to provide a novel thermal printing recording apparatus which can perform printing at a resolution as high as not less than 600 DPI (Dot Per Inch) and a higher rate than the prior art.

The foregoing object of the present invention will become more apparent from the following detailed description and examples.

The present invention provides a thermal printing recording apparatus, comprising a light-emitting means which emits light according to image data, and a light-receiving heating element which selectively generates heat on the area irradiated with light from said light-emitting means, said light-receiving heating element comprising a photoconductive layer which reduces its resistivity on the irradiated area, a heating layer laminated thereon, and a pair of electrically conductive layers arranged interposing the photoconductive layer and the heating layer in such a manner that an electric current is passed to said heating layer through said photoconductive layer on the area whose resistivity has been reduced to cause said heating layer to generate heat, one of said two electrically conductive layers on the photoconductive layer side being a transparent layer and transmitting light from said light-emitting means, whereby said light-receiving heating element is irradiated with light from said light-emitting means on said light transmitting electrically conductive layer according to image data so that it can convert an optical image to a heat image to perform printing.

As the light-emitting means there may be a means which emits laser beam.

As the material constituting the foregoing photoconductive layer there may be used a material which can withstand heat at a temperature of 250° C. or more.

The resistivity of the heating layer may be adjusted to a value between the dark resistivity and the bright resistivity per pixel of the photoconductive layer.

As material constituting the photoconductive layer there may be preferably used a heat-resistant photoconductive material, including one or more substances selected from the group consisting of crystalline silicon, polycrystalline silicon, fine-crystalline silicon and amorphous silicon.

An electric current injection controlling layer is provided interposed between the transparent electrically conductive layer and the photoconductive layer. Alternatively, a photocurrent injection controlling layer may be provided interposed between the photoconductive layer and the heating layer.

As the light-emitting means there may be a means which performs light-scattering. If necessary, the light-receiving heating element forms a trapezoidal protrusion in the vicinity of the heating area to be irradiated with light on the image printing side.

The light-receiving heating element may be provided with a protective layer containing a particulate lubricant on the image printing side.

As the light-receiving heating element there may be used a means capable of modulating the intensity or radiation of emission according to gradation. A screen generator is used to reproduce middle tone.

As the current passed to the electrically conductive layer there may be used direct current (d.c.).

BRIEF DESCRIPTION OF THE DRAWINGS

By way of example and to make the description more clear, reference is made to the accompanying drawings in which.

Figure 1:
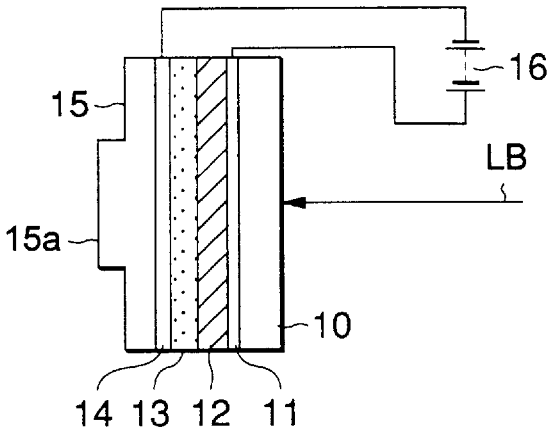
FIG. 1 is a sectional view of a light-receiving heating element constituting an embodiment of the thermal printing recording apparatus according to the present invention.

The reference numeral 1 indicates a thermal printing recording apparatus, the reference numeral 2 indicates a light-emitting means, the reference numeral 3 indicates a light-receiving heating element, the reference numeral 4 indicates an ink ribbon film, the reference numeral 5 indicates a recording paper, the reference numeral 6 indicates a platen roll, the reference numeral 10 indicates a transparent substrate, the reference numeral 11 indicates a transparent electrically conductive layer, the reference numeral 12 indicates a photoconductive layer, the reference numeral 13 indicates a heating layer, the reference numeral 14 indicates an electrically conductive layer, and the reference numeral 15 indicates a protective layer.

Thus, the main constituents of the thermal printing recording apparatus of the present invention are a light-receiving heating element obtained by laminating a photoconductive layer, a heating layer and an electrically conductive layer in sequence, an apparatus for applying a bias voltage across a pair of electrically conductive layers, and a means for emitting light corresponding to image signal. These constituents will be further described hereinafter.

As a light-emitting means there may be used a system capable of emitting light corresponding to image signal, e.g, laser scanning system, LED (Laser Emitted Diode) head system, analog slit exposure system, liquid crystal shutter array system, OFT (optical fiber tube) system and VFIB system (fluorescent substance).

In particular, the laser scanning system can converge an input picture element to a small size (on the order of several micrometers). It exhibits excellent properties as a high resolution input system. By employing a screen generator, it can easily provide reproduction of high precision multi-gradation halftone. Thus, the laser scanning system has many advantages.

The light-receiving heating element can be obtained by sequentially laminating at least a photoconductive layer, a heating layer, and a pair of electrically conductive layers, and optionally a transparent support and a protective layer.

As such a transparent support there may be preferably used a material system having a high transmission to light beam in the image signal input system. In particular, a material having a transmission of not less than 30% in the effective absorption wavelength range of the photoconductive layer is desirable. Further, a material which can withstand heat at a temperature of not lower than 120° C. is desirable. Specific preferred examples of such a support material include various silicon glass materials, fluorine compound materials, polyimide materials, polyaramide materials, polyester materials, acrylic resin materials, and silicone resin materials. However, if any layer in the light-receiving heat element has a supporting ability itself, such a support may be provided in the form of thin layer or may be omitted.

As the transparent photoconductive layer there may be used a light transmitting material having a volume resistivity of not more than $10^3 \Omega\cdot cm$. For example, ITO (Indium-Tin-Oxide), $SnO_2$ and doped materials thereof, $In_2O_3$, ZnO and doped materials thereof, and $CdIn_2O_4$, $Cd_2SnO_4$, and mixture thereof may be preferably used. In order to form the photoconductive layer, spray coating method, vacuum metallizing method, RF (Radio Frequency) sputtering method, DC (Direct Current) sputtering method, CVD method or the like may be used. The thickness of the photoconductive layer thus formed is not less than 200 Å from the standpoint of resistivity, or not more than 5 μm from the standpoint of transmission. The photoconductive layer is preferably made of a material which can withstand heat at a temperature of 200° C. or more. If the photoconductive layer is made of a material which is less in heat resistant than that, it can impair the stability and repeatability of thermal printing. In a particularly preferred embodiment, the photoconductive layer material should withstand heat at a temperature of 400° C. or more.

The photoconductive layer is made of a material which is photoconductive to visible light, ultraviolet ray or near infrared light. When irradiated with visible light, ultraviolet ray or near infrared light, this material renders the photoconductive layer photoconductive such that the volume resistivity of the irradiated surface is 3 times or more, preferably 20 times or more that of the unirradiated surface. Further, the photoconductive layer is preferably made of a material which can withstand heat at a temperature of 150° C. or more, preferably 250° C. or more. Examples of such a material include crystalline silicon, polycrystalline silicon, microcrystalline silicon, amorphous silicon, mixture thereof, mixture thereof with other substances, doped materials thereof, zinc oxide, cadmium sulfide, phthalocyanine coloring materials, perylene coloring materials, mixture thereof with other substances, and doped materials thereof.

The heating layer is made of an electrically heated material which generates Joule heat when electric current passes through the layer. The material needs to withstand heat at a temperature 150° C. or more, preferably 300° C. or more, and exhibit a volume resistivity of from $10^{-2}$ to $10^{5}$ Ω·cm. The thickness of the heating layer is preferably from 0.01 to 10 μm. As the heating layer material there may be used various ceramic materials in the form of single layer or in admixture or composite layer (four or five layers), a mixture or composite of a heat-resistant resin with one or more electrically conductive or insulating fillers, or a mixture or composite of various ceramic materials with metallic materials. Specific examples of the heat-resistant resin employable in the present invention include polyimide resin, polyaramid resin, polyester resin, polyimido-amido resin, polysulfone resin, polyphenylene oxide resin, poly-P-xylylene resin, and derivatives thereof. Examples of the electrically conductive filler and electrically conducting material employable in the present invention include inorganic materials such as C, Ni, Au, Ag, Fe, Al, Ti, Pd, Ta, Cu, Co, Cr, Pt, Mo, Ru, W and In, $VO_2$, $Ru_2O$, TaN, SiC, $ZrO_2$, InO, $Ta_2N$, ZrN, NbN, VN, $TiB_2$, $ZrB_2$, $HfB_2$, $TaB_2$, $MoB_2$, $CrB_2$, $B_2C$, MoB, ZrC, VC, TiC, and compounds and mixtures thereof. The insulating material for use in the resistivity control or binding preferably comprises the foregoing heat-resistant resin and various ceramic materials (e.g., alumina, zirconia, silicon compound, magnesium compound).

The electrically conductive layer preferably has an electrical conductivity of not more than 10 Ω·cm as calculated in terms of volume resistivity and a thickness of not more than 5 μm. In general, a thin film of a metallic material is preferred. If the electrically conductive layer is too thick, heat leakage occur. On the contrary, if the electrically conductive layer is too thin, it exhibits too high a resistivity. Specific examples of the electrically conductive layer material include inorganic materials such as C, Ni, Au, Ag, Fe, Al, Ti, Pd, Ta, Cu, Co, Cr, Pt, Mo, Ru, W and In, $VO_2$, $Ru_2O$, TaN, SiC, $ZrO_2$, InO, $Ta_2N$, ZrN, NbN, VN, $TiB_2$, $ZrB_2$, $HfB_2$, $TaB_2$, $MoB_2$, $CrB_2$, $B_2C$, MoB, ZrC, VC, and TiC.

The protective layer preferably can withstand heat at a temperature of 150° C. or more and has a thickness of not more than 12 μm, more preferably not more than 6 μm. Specific examples of the protective layer material include silicon oxide, compounds thereof, silicon nitride, silicon carbide, compounds thereof, titanium oxide, titanium nitride, titanium carbide, compounds thereof, tantalum ceramics, compounds thereof, other ceramics, compounds thereof, silicone resin, fluorine-contained resin, and modified resins thereof. A mixture of these materials can exert more effects. If the protective layer comprises a particulate lubricant dispersed therein, it exhibits an improved abrasion resistance. Examples of the particulate lubricant include carbon black, graphite, molybdenum dioxide, zinc oxide, fluorine-contained resin, boron nitride, silicon carbide, silicone oil, boron oxide, and calcium fluoride. These materials may be used in admixture.

The light-receiving heating element may be in the form of strip or narrow plate. The light-receiving heating element is preferably sectionally shaped protrusive on the other side thereof (heat image development side) in the vicinity of protective layer or electrically conductive layer opposite the irradiated area. The protrusive section extends along the light scanning direction. The height of the protrusion is preferably from 10 μm to 5 mm. If the height of the protrusion falls below this range, it cannot exert the remarkable effect of the present invention. On the contrary, if the height of the protrusion exceeds this range, the protrusion can be more hardly shaped, adding to the manufacturing cost. The light-receiving heating element may be in the form of arc or ellipse. The light-receiving heating element is arranged such that the scanning light is incident thereupon perpendicular to the area on which a heat image is developed. These requirements are the most efficient optimum conditions. Referring to the size of the printing portion, there are a line type printing portion which can accommodate the width of recording paper in the scanning direction and a small size serial type printing portion. The reflection scanning length may be at least the scanning width. For margin, the reflection scanning length may be preferably not less than 30 times the scanning width. However, if the light-receiving heating element is too wide, the efficiency of contact thereof with the recording paper under pressure is reduced. Thus, contact pressure must be applied more than necessary, causing a drop in the durability of the light-receiving heating element. The light-receiving heating element can provide an effective thermal transfer of a heat image to a recording medium to perform printing. Further, the contact pressure can work so efficiently that thermal printing of heat image causes little image defects, enabling the reproduction of a high resolution image and realizing the enhancement of precision in the reproduction of middle tone.

The apparatus for applying a bias voltage is an apparatus which applies a voltage across the transparent electrically conductive layer and the electrically conductive layer to allow the injection of energy into the light-receiving heating element. This voltage applying apparatus is preferably a d.c. power supply. This voltage applying apparatus is adapted to maintain a predetermined potential without supplying electric current while the light-receiving heating element is not being irradiated with light and causes a large electric current to flow between the light transmitting or transparent electrically conductive layer and the electrically conductive layer to allow the injection of energy into the light-receiving heating element while the light-receiving heating element is being irradiated with light to cause a drastic drop in the resistivity of the photoconductive layer on the irradiated area. This makes it possible to form a heat image with a high energy S/N ratio corresponding to irradiation with light.

In an embodiment of the thermal printing process of the present invention, an ink medium is used. The ink layer of the ink medium comprises a coloring material mixed or dispersed in a thermoplastic resin or comprises a sublimable dye as a main component. The ink material is transferred from a heat image on the element to a recording material by heating. The ink material which has thus been imagewise transferred is then developed to perform printing. In another embodiment, an image is developed on a recording material by a heat image on the element to perform printing.

An example of the printing process by the thermal printing recording apparatus of the present invention will be described hereinafter. In the printing operation by the thermal printing recording apparatus, the ink layer surface of the ink medium and the recording material are bonded to each other under pressure. An electric voltage is applied across the light transmitting electrically conductive layer and the electrically conductive layer. Under these conditions, the light receiving heating element having a photoconductive layer is imagewise irradiated with light beam on the light transmitting electrically conductive layer. The exposure causes a drastic drop in the resistivity of the photoconductive layer, allowing a large electric current to flow from the light transmitting layer on the exposed area to the photoconductive layer to cause electrical heating in the heating layer under the exposed area. In this manner, a heat image corresponding to the imagewise exposure is formed on the light-receiving heating element. This heat image is then thermally transferred to the ink layer of an ink ribbon. The ink material is hot-melted faithfully to the heat image, and then transferred to the recording material to complete printing.

The present invention will be further described in the following examples, but the present invention should not be construed as being limited thereto.

EMBODIMENT 1

Figure 2:
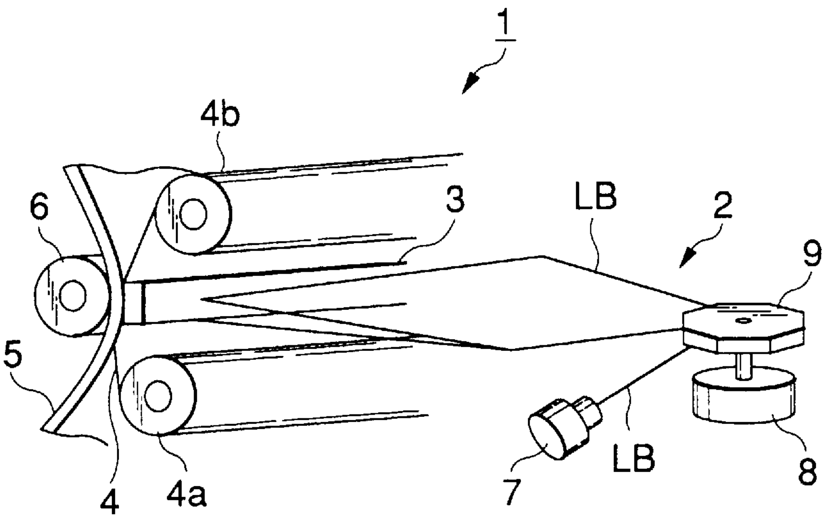
FIG. 2 is a perspective view of an embodiment of the thermal printing recording apparatus according to the present invention.
Figure 3:
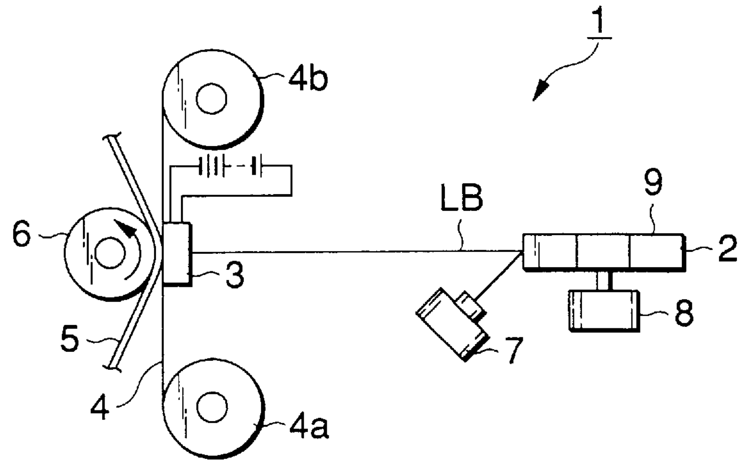
FIG. 3 is a sectional view of an embodiment of the image formation apparatus according to the present invention.

FIGS. 2 and 3 indicate a first embodiment of the thermal printing recording apparatus of the present invention.

As shown in FIGS. 2 and 3, the thermal printing recording apparatus 1 of the present invention comprises as essential parts a light emitting means 2 for emitting laser beam corresponding to image signal, a light-receiving heating element 3 which selectively generates heat on the area irradiated with laser beam from the light emitting means 2, and a platen roll 6 against which the light-receiving heating element 3 is pressed via a ink ribbon film 4 and a recording paper 5.

As shown in FIGS. 2 and 3, the light emitting means 2 reflects laser beam LB emitted by a semiconductor laser 7 corresponding to image signal by a polygon mirror 9, driven by motor 8, swings the laser beam LB thus reflected by the polygon mirror 9 through a converging lens (not shown) along the length direction of the light-receiving heating element 3 corresponding to image signal.

The light-receiving heating element 3 comprises a photoconductive layer which reduces its resistivity on the irradiated area, a heating layer laminated thereon, and a pair of electrically conductive layers arranged interposing the photoconductive layer and the heating layer in such a manner that an electric current is passed to the heating layer through the photoconductive layer on the area whose resistivity has been reduced to cause the heating layer to generate heat, one of the two electrically conductive layers on the photoconductive layer side being transparent.

As shown in FIG. 1, the light-receiving heating element 3 comprises a transparent substrate 10 on the side which is irradiated with laser beam LB. On the transparent substrate 10 are laminated a transparent electrically conductive layer 11, a photoconductive layer 12 which reduces its resistivity on the area irradiated with light, a heating layer 13 which generates heat with an electric current passed through the photoconductive layer 12, an electrically conductive layer 14 through which an electric current is passed to the heating layer 13, and a protective layer 15 for protecting the surface of the light-receiving heating element 3 in this order. The protective layer 15 is thicker on a central part 15*a* which is brought into contact with an ink ribbon film 4 than on the other area. A predetermined d.c. bias voltage from a bias power supply 16 is applied across the transparent electrically conductive layer 11 and the electrically conductive layer 14. In the shown embodiment, the light-receiving heating element 3 is in the form of a rod whose length is almost the same as the width of a recording paper 5.

Figure 4:
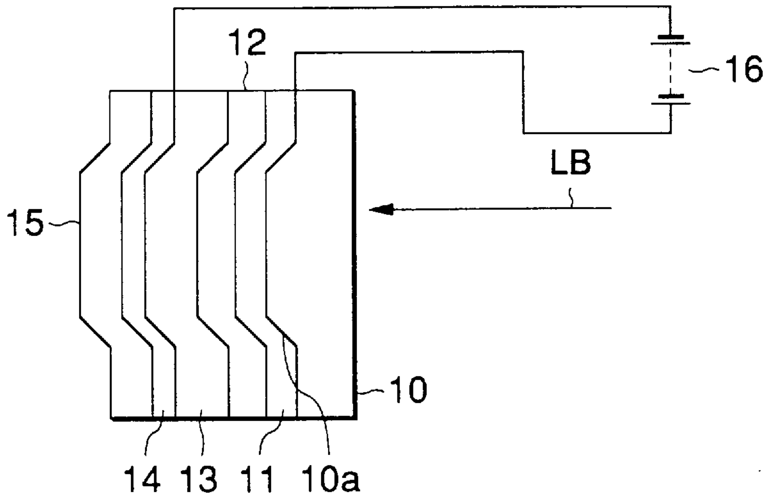
FIG. 4 is a sectional view of another embodiment of the light-receiving heating element.

The light-receiving heating element 3 may also be in the form shown in FIG. 4. The light-receiving heating element 3 shown in FIG. 4 comprises a transparent substrate 10 on the side which is irradiated with laser beam LB similarly to that shown in FIG. 1. Unlike that shown in FIG. 1, the transparent substrate 10 is not flat but is thicker on a central protrusion area 10*a* corresponding to the area which is brought into contact with an ink ribbon film 4. On the transparent substrate 10 are laminated a transparent electrically conductive layer 11, a photoconductive layer 12 which reduces its resistivity on the area irradiated with laser beam, a heating layer 13 which generates heat with an electric current passed through the photoconductive layer 12, an electrically conductive layer 14 through which an electric current is passed to the heating layer 13, and a protective layer 15 for protecting the surface of the light-receiving heating element 3 in this order similarly to that shown in FIG. 1.

Figures 5A, 5B, 5C, 5D:
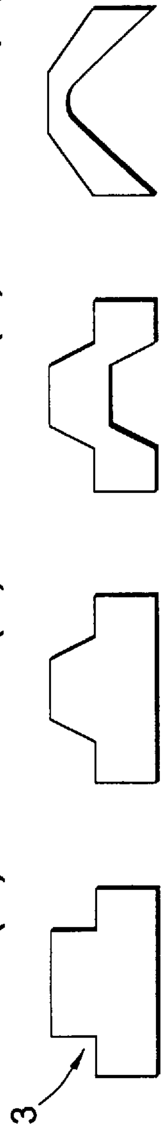
FIGS. 5(*a*) to (*d*) each indicate a sectional view of other light-receiving heating elements.
Figures 6A, 6B, 6C, 6D, 6E:
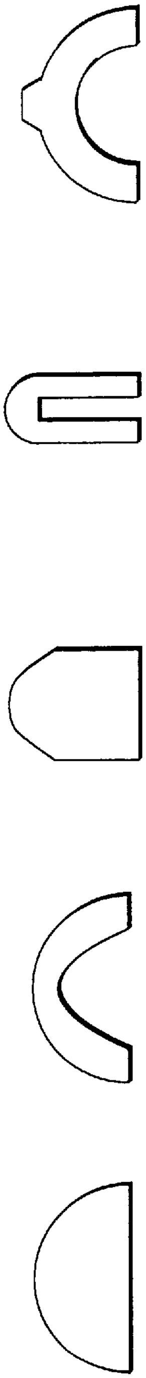
FIGS. 6(*a*) to (*e*) each indicate a sectional view of other light-receiving heating elements.
Figures 7A, 7B, 7C, 7D:
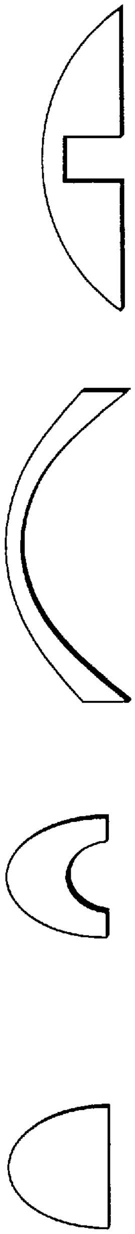
FIGS. 7(*a*) to (*d*) each indicate a sectional view of other light-receiving heating elements.

The section of the light-receiving heating element 3 is not limited to the foregoing shapes but may be in a block form shown in FIGS. 5(*a*) to (*d*), circular form shown in FIGS. 6(*a*) to (*e*) or elliptic form shown in FIGS. 7(*a*) to (*d*). The section of the light-receiving heating element 3 corresponds to that of the transparent substrate 10 constituting the light-receiving heating element 3 as well as all other constituents such as transparent electrically conductive layer 11 and photoconductive layer 12. However, since the transparent substrate 10 is distinguishably thickest in the elements constituting the light-receiving heating element 3 and the other constituent elements are in the form of thin layer, the section of the light-receiving heating element 3 is dominated by that of the transparent substrate 10.

By properly selecting the section of the light-receiving heating element 3, it is made possible to provide a good irradiation of the light-receiving heating element with light, determine the heat-generating area, provide a good contact of the light-receiving heating element 3 with the ink ribbon film 4, and reduce the abrasion of the light-receiving heating element 3.

Figure 8B:
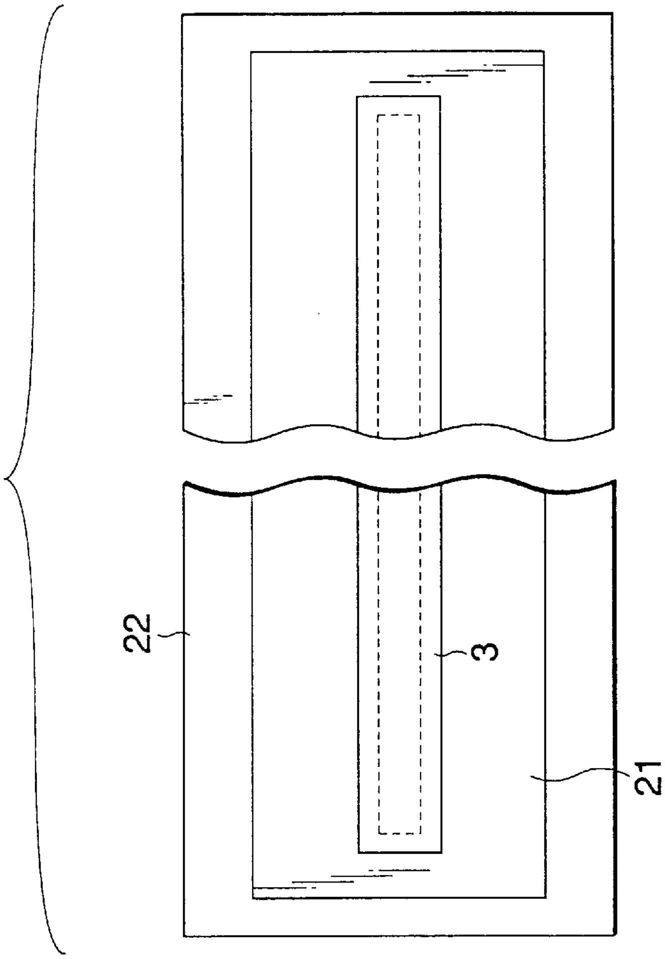
FIGS. 8(*a*) and (*b*) indicate a sectional view and a front view of the light-receiving heating element.
Figure 8A:
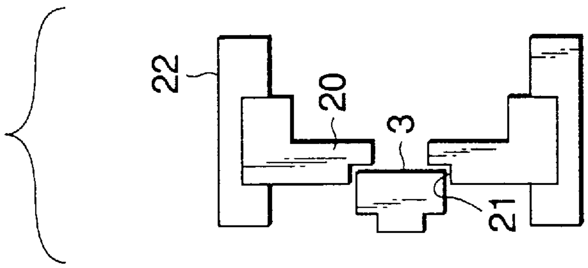

As shown in FIG. 8, for example, the light-receiving heating element 3 having the foregoing constitution is mounted on a ceramic substrate 20 having an opening 21 whose shape corresponds to that of the light-receiving heating element 3. The ceramic substrate 20 is mounted on a metal frame 22 of a thermal printing recording apparatus 1.

The ink ribbon film 4 is in the form of a thin film having almost the same width as that of the recording paper 5. The ink ribbon film 4 is released from a roll 4*a* for unused ink film ribbon and then wound on a roll 4*b* for used ink film ribbon.

The recording paper 5 is supplied from a paper feed cassette (not shown) into the gap between the light-receiving heating element 3 and the platen roll 6 in synchronism with the timing of image printing.

The platen roll 6 is rotationally driven by a driving means (not shown) at a predetermined velocity along the arrow. It is adapted to carry the recording paper 5 and the ink ribbon film 4 according to the predetermined printing speed.

In this arrangement, the thermal printing recording apparatus according to the present example performs image printing as follows. In operation, as shown in FIGS. 2 and 3, the ink layer side of the ink ribbon film 4 and the recording paper 5 are brought into contact with each other under pressure by means of the platen roll 6. Under these conditions, the light-receiving heating element 3 comprising the photoconductive layer 12 is imagewise irradiated with laser beam LB on the transparent electrically conductive layer side while a predetermined voltage from a bias power supply 16 is being applied across the transparent electrically conductive layer 11 and the electrically conductive layer 14. The exposure causes a drastic drop in the resistivity of the photoconductive layer 12, allowing a large electric current to flow from the light transmitting layer 11 on the exposed area to the photoconductive layer 12 to cause electrical heating in the heating layer 13 directly under the exposed area. In this manner, a heat image corresponding to the imagewise exposure is formed on the light-receiving heating element 3. This heat image is then thermally transferred to the ink layer of an ink ribbon film 4. The ink material is hot-melted faithfully to the heat image and then transferred to the recording material to complete printing.

As mentioned above, the thermal printing recording apparatus 1 is arranged such that the light-receiving heating element 3 is irradiated with laser beam LB from the light emitting means 2 corresponding to image signal and then allowed to generate heat selectively on the irradiated area, whereby an image is printed. Thus, an image can be printed at a resolution corresponding to the diameter of laser beam LB emitted by the light-emitting means 2. Accordingly, printing with a resolution as high as 600 DPI is made possible. In the thermal printing recording apparatus 1, the light-receiving heating element 3 is not heated by heat energy of laser beam. When irradiated with laser beam LB, the photoconductive layer 12 is rendered electrically conductive, causing the selective passage of an electric current to the heating layer 13 which then generates heat. Thus, the light-receiving heating layer 3 can generate enough heat to momentarily melt or sublimate the ink on the ink ribbon film 4 onto the recording paper 5 for image printing. Accordingly, printing can be effected at a higher speed than the prior art.

EMBODIMENT 2

Figure 9:
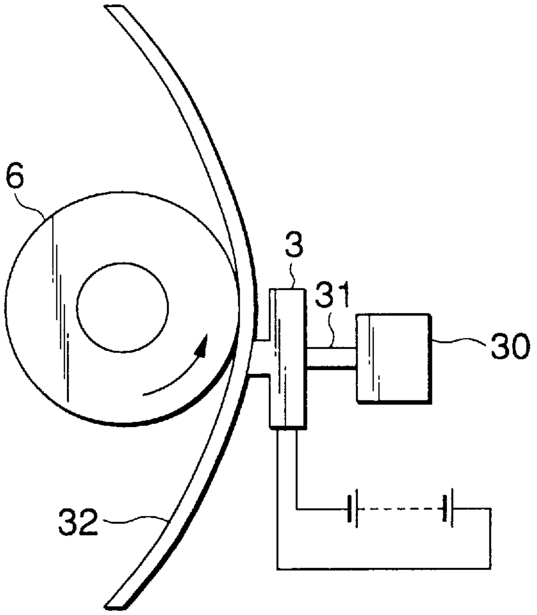
FIG. 9 is a sectional view illustrating a second embodiment of the thermal printing recording apparatus according to the present invention.

FIG. 9 indicates a second embodiment of the present invention. Referring to this arrangement with like numerals used where the parts are the same as those of the previous example, an LED optical input device which emits light according to image signal is used instead of the light-emitting means 2 which emits laser beam. Further, a heat-sensitive recording paper which itself develops colors when heated is used instead of the ink ribbon film and the recording paper to which an ink is transferred from the ink ribbon film.

In some detail, the present example employs an LED optical input device 30 which emits light according to image signal instead of the light-emitting means 2. Light from the LED optical input device 30 is incident upon the light-receiving heating element 3 through CELFOC LENS® 31 which is a converging lens providing equal magnification.

As the recording paper there is used a heat-sensitive recording paper 32 which itself develops colors when heated as mentioned above.

Other constitutions and mechanisms are the same as those of Example 1 and thus are not further described.

EMBODIMENT 3

Figure 10:
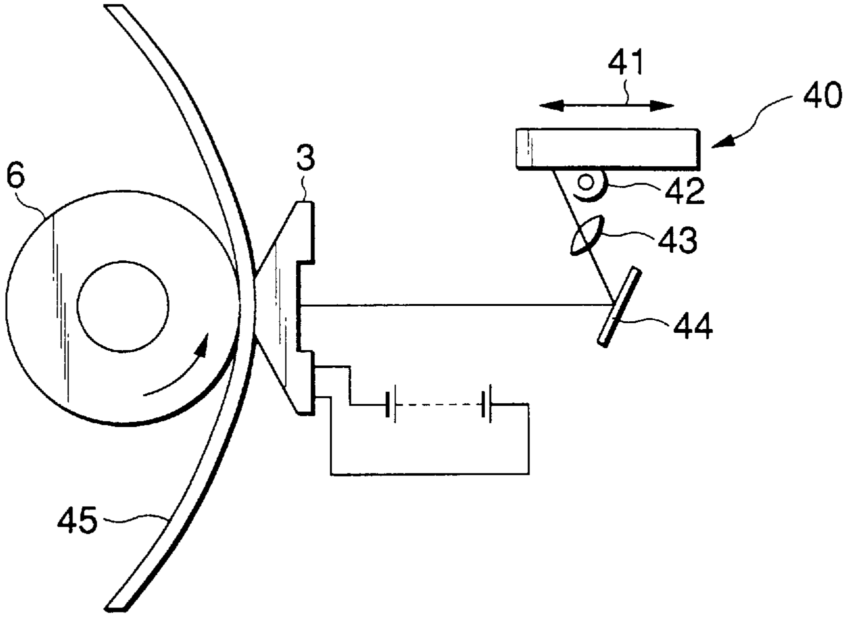
FIG. 10 is a sectional view illustrating a third embodiment of the thermal printing recording apparatus according to the present invention.
Figure 11:
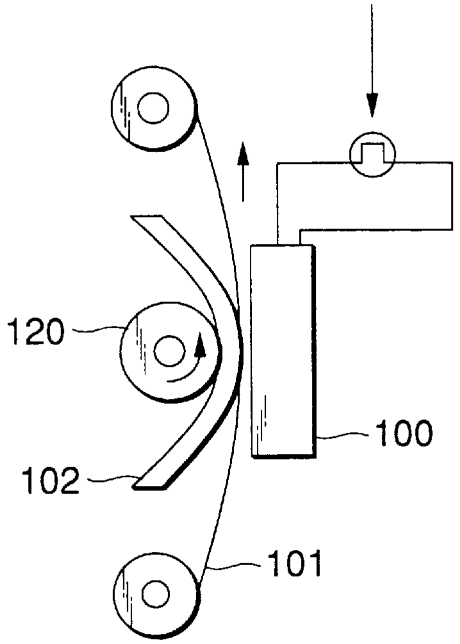
FIG.11 PRIOR ART
FIG. 11 is a sectional view illustrating a conventional thermal printing recording apparatus.
Figure 12:
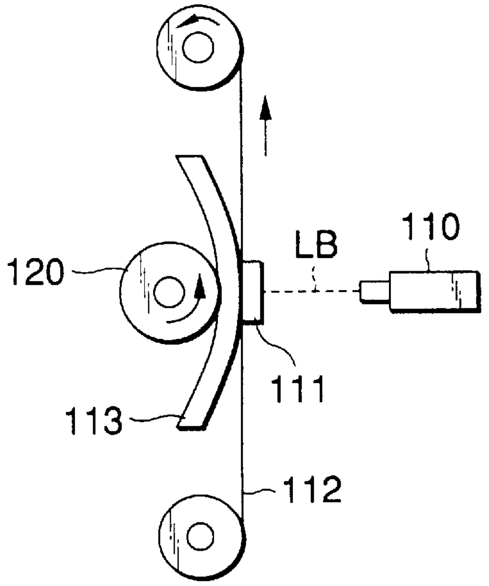
FIG.12 PRIOR ART
FIG. 12 is a sectional view illustrating another conventional thermal printing recording apparatus.

FIG. 10 indicates a third embodiment of the present invention. Referring to this arrangement with like numerals used where the parts are the same as those of the previous example, a so-called light lens imagewise exposure apparatus which performs scanning exposure to original image is used instead of the light-emitting means which emits laser beam. Further, a heat-sensitive recording paper which develops colors when heated is used instead of the ink ribbon film and the recording paper to which an ink is transferred from the ink ribbon film. Moreover, the section of the light-receiving heating element is different from that of the previous example.

In some detail, the present example employs a so-called light lens imagewise exposure apparatus 40 which performs scanning exposure to original image instead of the light-emitting heating element 2. The imagewise exposure apparatus 40 comprises a light source 42 for irradiating an original 41 provided on a platen glass (not shown), and a lens 43 and a mirror 44 for converging the optical image from the original irradiated with light from the light source 42.

The section of the light-receiving heating element 3 is as shown in FIG. 5(*c*).

As the recording paper there is used a heat-sensitive recording paper 45 which develops colors when heated as mentioned above.

Other constitutions and mechanisms are the same as those of Example 1 and thus are not further described.

EMBODIMENT 4

Figure 13:
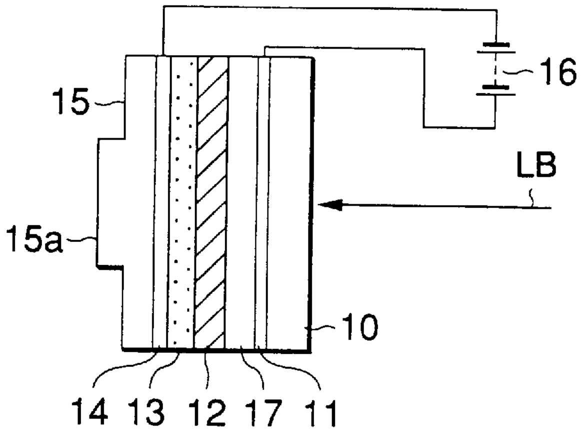
FIG. 13 is a sectional view illustrating a fourth embodiment of the thermal printing recording apparatus according to the present invention.

FIG. 13 illustrates a fourth embodiment of the present invention. Referring to this arrangement with like numerals used where the parts are the same as those of the previous example, an electric current injection controlling layer 17 is provided interposed between the transparent electrically conductive layer 11 and the photoconductive layer 12.

Other constitutions and mechanisms are the same as those of Example 1 and thus are not further described.

EXAMPLE 1

In Experiment Example 1, a light-receiving heating element 3 was prepared as follows. In some detail, a thin film of indium oxide/tin oxide was vacuum deposited on the surface of a 15-mm thick quartz glass plate 10 having the same shape as shown in FIG. 6(*b*) from a calcined pellet of indium oxide/tin oxide at a substrate temperature of 350° C. This vacuum metallizing process was effected under a pressure of $1.2\times10^{-5}$ Torr and then under a partial pressure of $7\times10^{-5}$ Torr obtained by the introduction of oxygen. Thus, a transparent electrically conductive layer 11 having a surface resistivity of 0.85 Ω/□ was obtained. (Although the unit of surface resistivity is Ω, Ω/□ is used to distinguish from ordinary resistivity.) Subsequently, a 1.3 μm thick amorphous silicon layer was formed on the transparent electrically conductive layer 11 by a plasma CVD film forming process. In this plasma CVD film forming process, glow discharge was effected at a substrate temperature of 250° C. while a silane gas was being into the vacuum system. The amorphous silicon layer was then annealed with Ar laser beam to obtain a photoconductive layer 12. A 1.1 μm thick heating layer 13 was then formed on the photoconductive layer 12 by RF sputtering process at a substrate temperature of 300° C. with a sintered mixture of $SiO_2$ and Ta as a target. A 0.3 μm thick aluminum layer was formed on the surface of the heating layer 13 at room temperature by sputter thin film forming process to obtain an electrically conductive layer 14. An $SiO_2$ film was then formed on the electrically conductive layer 14 by EB vacuum metallizing process to provide a 5 μm thick protective layer 15. Thus, the light-receiving heating element 3 was completed.

A laser beam scanning type thermal printing recording apparatus 1 as shown in FIGS. 2 and 3 was used to effect a printing experiment. In this experiment, laser beam LB was emitted by a laser diode having an oscillation wavelength of 780 μm and an output of 30 mW. Laser beam LB from the laser diode was swung by means of a polygon mirror 9 to input an optical signal into a light-receiving heating element 3 against which a copying paper 5 and a cyan color ink ribbon film 4 were pressed. In this process, the copying paper 5 was brought into contact with the light-receiving heating element 3 on the ink layer side under a pressure of 250 g/cm$^2$. The voltage applied across the transparent electrically conductive layer 11 and the electrically conductive layer 14 was adjusted to 12 d.c. volt. As a result, an image with an optical cyan density of 1.3 was formed on the copying paper 5. The printing dot corresponded to 800 DPI (Dot Per Inch), resulted in good printing quality. The printing process speed was as fast as 40 mm/sec.

EXAMPLE 2

A 10-mm thick quartz glass plate 10 having a shape shown in FIG. 5(*b*) was etched by a photolithographic process with a hydrogen fluoride solution to form a protrusion having a width of 70 μm, a length of 220 mm and a height of 60 μm thereon. Subsequently, a 0.5 μm thick ITO film was formed on the etched surface of the quartz glass plate 10 by a sputtering process to provide a transparent electrically conductive layer 11. A 3 μm thick amorphous silicon photoconductive layer 12 was formed on the transparent electrically conductive layer 11 by a plasma CVD film forming process. In this plasma CVD film forming process, glow discharge was effected while a silane gas was being introduced into the vacuum system wherein the substrate 10 was heated to a temperature of 270° C. A polyimide resin containing 17 wt. % of particulate carbon black dispersed therein was applied to the photoconductive layer 12, dried, and then cured at a temperature of 330° C. to provide a 3 μm thick heating layer 13. A 0.7 μm thick Ni/Al alloy film was formed on the heating layer 13 by a high frequency sputtering process to provide an electrically conductive layer 14. Subsequently, a dispersion of teflon powder and graphite in a polyimide precursor was applied to the electrically conductive layer 14 by a dip coating method, dried, and then cured to provide a 4.2 μm thick protective layer 15. Thus, a light-receiving heating element 3 was completed.

The laser beam scanning type thermal printing recording apparatus 1 shown in FIGS. 2 and 3 was used to effect a printing experiment. In this experiment, laser beam LB was emitted by a laser diode 7 having an oscillation wavelength of 780 μm and an output of 30 mW. Laser beam LB from the laser diode 7 was swung by means of a polygon mirror 9 to input an optical signal into a light-receiving heating element 3 against which a copying paper 5 and a cyan color ink ribbon film 4 were pressed. In this process, an ink ribbon film 4 and a copying paper 5 were clamped between a platen roll 6 having a rubber hardness of 35 and the light-receiving heating element 3 under a linear load of 150 g/cm. The voltage applied across the transparent electrically conductive layer 11 and the electrically conductive layer 14 was a pulse voltage adjusted to 20 d.c. volt. As a result, an image with an optical cyan density of 1.5 was formed on the copying paper 5. The printing dot corresponded to 900 dpi, resulted in good printing quality. The printing process speed was 20 mm/sec. The percent printing error (percent occurrence of malprinted dots having a diameter of not more than 40% of the specified dot diameter) was not more than 1%.

In order to evaluate the light-receiving heating element 3 for durability, printing was continuously effected over 2,000 sheets of copying paper. As a result, it was found that the protrusion 15 of the light-receiving heating element 3 had shown an abrasion loss of not more than 1 μm.

Comparitive Example 1

A light-receiving heating element 3 having the same construction as that of Example 2 was prepared except that the protective layer 15 of the light-receiving heating element 3 was made of a single polyimide substance. In order to evaluate the light-receiving heating element 3 for durability, printing was continuously effected over 1,000 sheets of copying paper. As a result, it was found that the protective layer 15 of the light-receiving element 3 had shown an abrasion loss of 2.2 μm.

Comparative Example 2

A light-receiving heating element 3 having the same construction as that of Example 2 was prepared except that the quartz glass plate 10 was not etched and the transparent support 10 was thus flat. The light-receiving heating element 3 thus prepared was evaluated for printing quality in the same manner as in Example 2. As a result, the percent printing error was found to be 11%.

Comparative Example 3

A light-receiving heating element 3 having the same construction as that of Example 2 was prepared except that the photoconductive layer 12 was formed of a selenium/arsenic alloy instead of amorphous silicone by a vacuum metallizing process. As the laser beam scanning system 2 there was used a He—Ne gas laser LB instead of the semiconductor laser taking into account the oscillation wavelength to which the light-receiving heating element 3 is sensitive. The gas laser beam LB was incident upon the light-receiving heating element 3 to input image signal into the light-receiving heating element 3. A printing experiment was effected in the same manner as above. As a result, it was found that under the bias voltage conditions that allow the generation of a sufficient amount of heat, the light-receiving heating element 3 had deformed or discolored itself on the area where the signal is inputted, causing the disorder of printing dots or the thermal damage on the light-receiving heating element 3.

EXAMPLE 3

An ITO film was formed on the surface of a 150 μm thick 3 mm wide strip quartz glass plate 10 at a substrate temperature of 350° C. with a calcined ITO as a target by RF sputter film forming process under an argon partial pressure of 3×10 Torr to provide a transparent electrically. conductive layer 11 having a surface resistivity of 1.35 Ω/□. An amorphous silicon layer was then formed on the transparent electrically conductive layer 11 by a plasma CVD film forming process which comprises glow discharge while a silane gas is being introduced into the vacuum system where the substrate is heat to a temperature of 250° C. During this film forming process, the amorphous silicon layer being formed was drastically annealed by an excimer laser beam to provide a 1.6 μm thick polycrystalline silicon photoconductive layer 12.

A 2.0 μm thick heating layer 13 was then formed on the photoconductive layer 12 at a substrate temperature of 300° C. with a calcined mixture of $SiO_2$ and Ta as a target by RF sputtering process. A 0.3-μm thick aluminum layer was then formed on the surface of the heating layer 13 at a substrate temperature equal to room temperature by RF sputter film forming process to provide an electrically conductive layer 14. A paste containing $SiO_2$, silicon carbide powder and graphite powder was then applied to the electrically conductive layer 14 by a screen printing process, and then heat-treated to provide a 5 μm thick protective layer 15. As shown in FIG. 8, the laminate was then reinforced by a tough rigid frame 22 to have a sufficient strength against the pressure under which it is brought into contact with the recording paper during printing. Thus, a light-receiving heating element 3 was completed.

The laser beam scanning type thermal printing recording apparatus 1 shown in FIGS. 2 and 3 was used to effect a printing experiment. In this experiment, laser beam LB was emitted by a laser diode 7 having an oscillation wavelength of 800 μm and an output of 40 mW. Laser beam LB from the laser diode 7 was swung by means of a polygon mirror 9 to input an optical signal into the light-receiving heating element 3 against which a copying paper 5 and a black color ink ribbon film 4 were pressed. In this process, the ink ribbon film 4 and the copying paper 5 were clamped between a platen roll 6 having a rubber hardness of 45 and the light-receiving heating element 3 under a linear load of 320 g/cm. The voltage applied across the transparent electrically conductive layer 11 and the electrically conductive layer 14 was a pulse voltage adjusted to 10 d.c. volt. As a result, an image with an optical black density of 1.3 was formed on the copying paper 5. The printing dot had a diameter of 25 μm (corresponding to 1,000 dpi), resulted in good printing quality. The printing process speed was high as 40 mm/sec. The percent printing error (percent occurrence of malprinted dots having a diameter of not more than 40% of the specified dot diameter) was not more than 1%.

In accordance with the present invention, the light-receiving heating element having the foregoing constitution and mechanism is irradiated with light according to image signal on the photoconductive layer so that it generates heat on the area thus irradiated. Thus, a high resolution printing can be effected. Further, a good reproduction of halftone image can be provided. A highly uniform printing dot can be provided. Moreover, a high printing speed can be provided.

While the invention has been described in detail and with reference to specific embodiments thereof, it will be apparent to one skilled in the art that various changes and modifications can be made therein without departing from the spirit and scope thereof.

What is claimed is:

1. A thermal printing recording apparatus, comprising:

light-emitting means for emitting light according to image data, wherein the light-emitting means emits a laser beam; and a light-receiving heating element that selectively generates heat at an area irradiated with light from said light-emitting means, said light-receiving heating element comprising layers in sequence as follows:

a transparent electrically conductive layer for transmitting light from said light-emitting means;

a photoconductive layer that reduces its resistivity at the irradiated area, wherein the photoconductive layer comprises a silicon material that can withstand heat at a temperature of at least 250° C.;

a heating layer laminated on said photoconductive layer for generating heat, wherein said heating layer has a volume resistivity of from $10^{-2}$ to $10^{5}$ Ω·cm; and an electrically conductive layer, wherein an electric current passing through said photoconductive layer to said heating layer at the area whose resistivity has been reduced causes said heating layer to generate heat thereby converting an optical image to a heat image to perform printing.

2. The thermal printing recording apparatus according to claim 1, wherein an electric current injection controlling layer is provided interposed between said transparent electrically conductive layer and said photoconductive layer.

3. The thermal printing recording apparatus according to claim 1, wherein said light-emitting means scans light and said light-receiving heating element forms a protrusion in a vicinity of the area irradiated with light on an image printing side, wherein the height of the protrusion is from 10 μm to 5 mm.

4. The thermal printing recording apparatus according to claim 1, wherein said light-receiving heating element is provided with a protective layer containing a particulate lubricant nearest the image printing side.

5. The thermal printing recording apparatus according to claim 1, wherein said light-receiving heating element emits light according to gradation of an image signal.

6. The thermal printing recording apparatus according to claim 1, wherein the electric current is direct current (d.c.).

7. The thermal printing recording apparatus according to claim 1, wherein said light-receiving heating element further comprises a transparent substrate positioned nearest the light-emitting means.

8. The thermal printing recording apparatus according to claim 1, wherein said heating layer has a thickness of from 0.01 μm to 10 μm.

9. A thermal printing recording apparatus, comprising:

light-emitting means for emitting light according to image data, wherein the light-emitting means emits a laser beam; and a light-receiving heating element that selectively generates heat at an area irradiated with light from said light-emitting means, said light-receiving heating element comprising layers in sequence as follows:

a transparent electrically conductive layer for transmitting light from said light-emitting means;

a photoconductive layer that reduces its resistivity at the irradiated area, wherein the photoconductive layer comprises one or more substances selected from a group consisting of crystalline silicon, polycrystalline silicon and fine-crystalline silicon;

a heating layer laminated on said photoconductive layer for generating heat; and an electrically conductive layer, wherein an electric current passing through said photoconductive layer to said heating layer at the area whose resistivity has been reduced causes said heating layer to generate heat thereby converting an optical image to a heat image to perform printing.

* * * * *